United States Patent
Liu et al.

(10) Patent No.: US 10,459,742 B2
(45) Date of Patent: Oct. 29, 2019

(54) SYSTEM AND METHOD FOR OPERATING SYSTEM INITIATED FIRMWARE UPDATE VIA UEFI APPLICATIONS

(71) Applicant: DELL PRODUCTS, LP, Round Rock, TX (US)

(72) Inventors: Wei Liu, Austin, TX (US); Po-Yu (Smith) Cheng, Tainan (TW)

(73) Assignee: Dell Products, LP, Round Rock, TX (US)

( * ) Notice: Subject to any disclaimer, the term of this patent is extended or adjusted under 35 U.S.C. 154(b) by 279 days.

(21) Appl. No.: 15/655,265

(22) Filed: Jul. 20, 2017

(65) Prior Publication Data

US 2019/0026126 A1    Jan. 24, 2019

(51) Int. Cl.
*G06F 9/445* (2018.01)
*G06F 8/654* (2018.01)

(52) U.S. Cl.
CPC .......... *G06F 9/44505* (2013.01); *G06F 8/654* (2018.02)

(58) Field of Classification Search
CPC ............................ G06F 8/654; G06F 9/44505
See application file for complete search history.

(56) References Cited

U.S. PATENT DOCUMENTS

| 9,507,581 B2 | 11/2016 | Butcher et al. |
| 2004/0255286 A1* | 12/2004 | Rothman ................... G06F 8/65 717/168 |
| 2006/0123223 A1* | 6/2006 | Mayfield ............... G06F 9/4403 713/2 |
| 2014/0331037 A1* | 11/2014 | Lewis .................... G06F 9/4401 713/2 |
| 2015/0089238 A1 | 3/2015 | Lewis |
| 2017/0242686 A1* | 8/2017 | Vidyadhara ............. G06F 8/656 |

* cited by examiner

*Primary Examiner* — Terrell S Johnson
(74) *Attorney, Agent, or Firm* — Larson Newman, LLP

(57) ABSTRACT

An information handling system includes a memory and a central processor. The memory stores a firmware update for a component of the information handling system. The central processor is operable in a pre-boot mode and in an operating system runtime mode. The central processor, while in the operating system runtime, updates a location of the firmware update in the memory via a unified extensible firmware interface (UEFI) runtime service, and triggers a firmware update for the component, via the UEFI runtime service, by a boot option number being set to a BootNext EFI variable.

20 Claims, 4 Drawing Sheets

SYSTEM AND METHOD FOR OPERATING SYSTEM INITIATED FIRMWARE UPDATE VIA UEFI APPLICATIONS

FIELD OF THE DISCLOSURE

The present disclosure generally relates to information handling systems, and more particularly relates to operating system initiated firmware updates via UEFI applications.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a memory and a central processor. The memory may store a firmware update for a component of the information handling system. The central processor is operable in a pre-boot mode and in an operating system runtime mode. The central processor, while in the operating system runtime, may update a location of the firmware update in the memory via a unified extensible firmware interface (UEFI) runtime service, and may trigger a firmware update for the component, via the UEFI runtime service, by a boot option number being set to a BootNext EFI variable.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
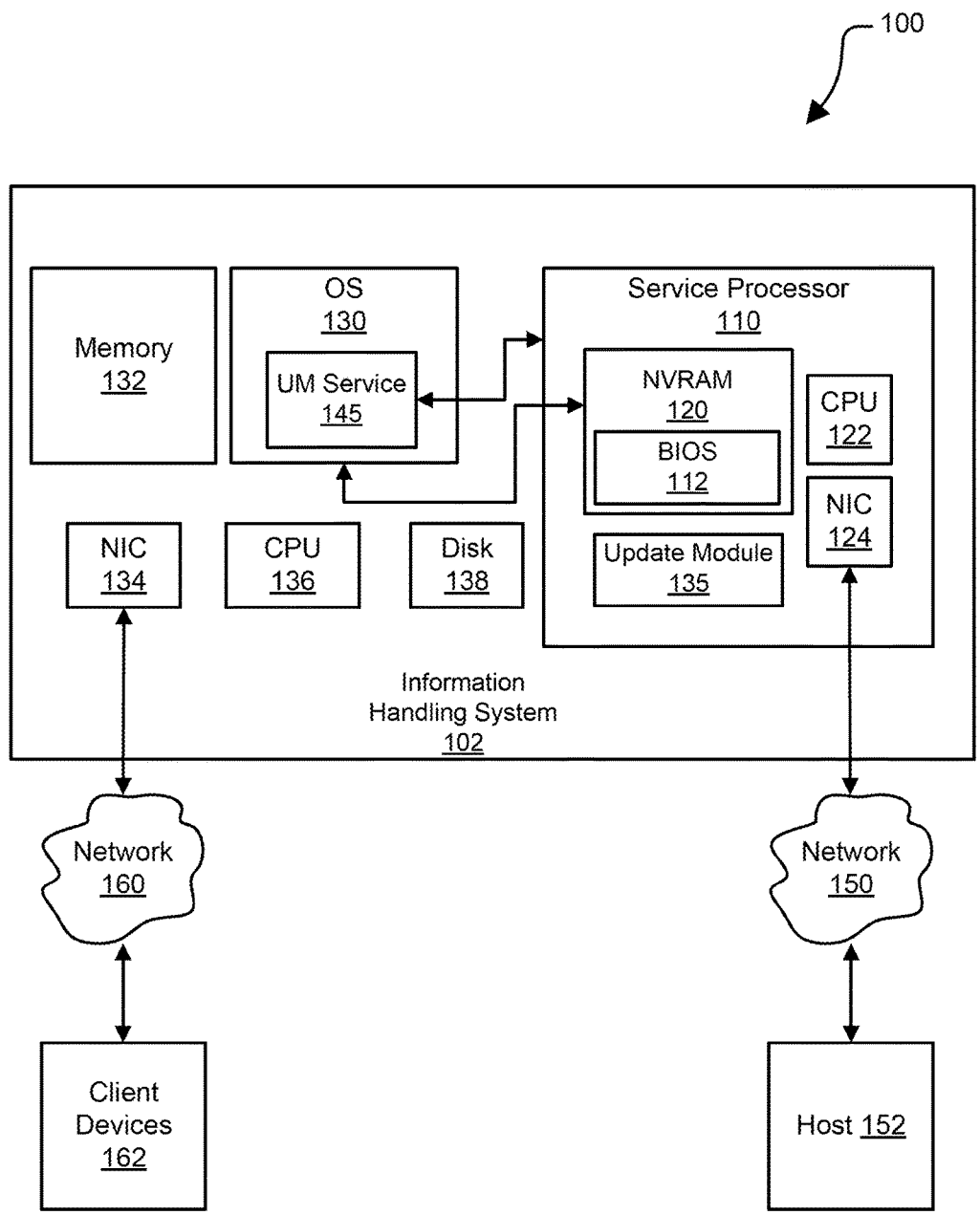
FIG. 1 is block diagram of a system including an information handling system according to at least one embodiment of the disclosure.

FIG. 1 shows a system 100 including an information handling system 102. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more buses operable to transmit communications between the various hardware components.

In an embodiment, the information handling system 102 can be a server. The information handling system 102 includes a service processor 110, a basic input/output system (BIOS) 112, operating system (OS) 130, a memory 132, a network interface card (NIC) 134, a central processing unit (CPU) 136, a disk 138, and a dynamic random access memory (DRAM) 140. In an embodiment, the DRAM 140 can be an on-chip memory for the CPU 136. The service processor 110 includes a non-volatile random access memory (NVRAM) 120, a CPU 122, a NIC 124, and an update module 135. For purposes of this application, the term NVRAM refers to all non-volatile memory technologies. The service processor 110 represents an integrated device or devices that is utilized to provide out-of-band management functions to the information handling system 102 that includes management system, and can include a chassis management controller (CMC), a baseboard management controller (BMC), a management engine (ME), an integral part of a Dell remote access controller (DRAC), or an integrated Dell remote access controller (iDRAC), which are systems management hardware and software solutions operable to provide remote management capabilities and that operate according to the an Intelligent Platform Management Interface (IPMI) specification, such as an IPMI Specification V2.0.

The service processor 110 of the information handling system 102 is connected to the host 152 through network 150, and to other the client devices 162 through the network 160. In some embodiments, the network 150 may comprise an out-of-band management network and the network 160 may comprise a client, OS, or in-band network. Other client devices 162 may be a client device communicating with information handling system 102 or may be another server of the system 100 that operates information handling system 102.

The service processor 110 may be any system, device, apparatus or component of information handling system 102 configured to permit an administrator or other person to remotely monitor and/or remotely manage information handling system 102 (for example, by an information handling system remotely connected to information handling system 102 via the network 150) regardless of whether information handling system 102 is powered on and/or has an operating system installed thereon. In certain embodiments, the service processor 110 may allow for out-of-band control of information handling system 102. Out-of-band communications refer to communications that may bypass an operating system, such as OS 130. The communications may utilize hardware resources and components that are independent of an operating system. In the embodiment of FIG. 1, network communications to and from the service processor 110 are sent through the NIC 124 that is physically isolated from the in band communication through network interface card 134. The NIC 124 may serve as an interface between the service processor 110 and the network 150. The NIC 124 may enable the service processor 110 to communicate over the network 150 using any suitable transmission protocol and/or standard.

In some embodiments, an administrator may be able to diagnose problems that have caused failure of information handling system 102. In the same or alternative embodiments, the service processor 110 may allow an administrator to remotely manage one or more parameters associated with operation of information handling system 102 such as power usage, processor allocation, memory allocation, or security privileges.

CPU 122 may be communicatively coupled to NVRAM 120, the NIC 124, and update module 135. CPU 122 may also be electrically coupled to a power source dedicated to the service processor 110. CPU 122 may include any system, device, or apparatus configured to interpret and/or execute program instructions and/or process data, and may include, without limitation a microprocessor, microcontroller, or any other digital or analog circuitry configured to interpret and/or execute program instructions and/or process data. In some embodiments, CPU 122 may interpret and/or execute program instructions and/or process data stored in NVRAM 120, update module 135, and/or another component of the service processor 110.

Update module 135 may obtain code for use on information handling system 102. For purposes of this disclosure, code includes software, firmware, and other forms of computer programs. Update module 135 may make the code available to information handling system 102. The code may be updates of previously installed code or may be for initial installation. Some of the code may be downloaded from the host 152 over the network 150. Update module 135 may constitute an advanced embedded system management tool for automated updates of system code, code inventory, code rollback (restoration of code to a previous version), and code correction. Update module 135 may reside in non-volatile memory, such as in NVRAM 120, may be started during a boot sequence, and may function in a pre-operating system environment. In some embodiments, the host 152 may be part of a cloud-computing facility. Cloud computing may refer to the access of computing resources and data via a network infrastructure, such as the Internet. The computing resources and data storage may be provided by linked data centers of the network infrastructure. In many embodiments, cloud computing resources are provided on demand to customers. As a result, the customers may have access to needed computer resources without having to purchase equipment or construct data centers.

The CPU 136 is configured to run the OS 130, such as Windows-based OS, Linux-based OS, or the like, during in-band operation, and can be configured to run Firmware Management Protocol (FMP) based pre-boot code, such as Dell Life Cycle Controller, during out-of-band operation as needed. Operating system 130 includes update manager service 145. Update manager service 145 is a service or daemon, a computer program that runs as a background process. Daemons may be started at boot time and may respond to network requests, hardware activity, or other programs by performing some task. Daemons may also configure hardware and run scheduled tasks. Update manager service 145 may be created by an operating system vendor or may be installed during the manufacture of information handling system 102.

In the embodiment of FIG. 1, update manager service 145 communicates with the service processor 110 about code, such as device drivers. A device driver may constitute software that acts as an interface between hardware and operating system 130 or another higher-level program. The device driver may communicate with the hardware over a communications bus. It may receive calls from the higher-level program and issue commands to the hardware in response to the commands.

Update manager service 145 may, for example, constantly scan for deployment of new hardware. If it detects new hardware, it may send a message to the service processor 110 to provide device drivers needed for the new hardware. The messages may be sent under a standard management protocol, such as Intelligent Platform Management Interface (IPMI) or WS-Management (WS-Man). Similarly, update manager service 145 may receive messages from the service processor 110 of the availability of code for use by operating system 130, such as the availability of device drivers for newly-installed hardware or updated device drivers and may inform operating system 130.

While OS 130 is loaded and running on CPU 136, such as during OS runtime, a firmware update can be received for a component within the information handling system 102. For example, a firmware update can be received for memory 132. In an embodiment, the memory 132 can be an M.2 hard disk drive (HDD). In an embodiment, the memory 132 may not have a universal serial bus (USB) ports, video displays, or the like to receive a firmware update. In different embodiments, the firmware update can be received by the service processor 110 from the host 152 via the network 150, or may be received by the CPU 136 via the network 162.

In an embodiment, the service processor 110 can be a management service module (MSM) of the information handling system 102, which in turn can be a Next generation modular (NGM) system. After the firmware update is received, the CPU 136, executing the OS 130, can store a UEFI utility and a payload of the firmware updated in a designated directory of a memory, such as NVRAM 120, disk 138, or the like. In an embodiment, the designated directory can be with an EFI System Partition (ESP) of the NVRAM 120. In an embodiment, the UEFI utility can be identified as Nautilus.efi. In an embodiment, a user can utilize a UEFI service, such as SetVariable runtime service, to update the location of the UEFI utility and the payload of the firmware update.

The CPU 136, executing the OS 130, can then write to a UEFI BootNext variable with a pre-defined boot option number. For example, the pre-defined boot option number can be BOOT0080. In an embodiment, the pre-defined boot option number can be any number that is not used by the information handling system 102 as an actual boot device. For example, the information handling system 102 will never have 0x80 boot option devices. The variable BootNext variable can be utilized as an indicator of the available update. In an embodiment, the variable BootNext can be defined according the UEFI specification. The CPU 136, executing the OS 130, can then also write to a Boot#### load option with the device path to the UEFI utility. In an embodiment, a designated Boot#### load option can be used to specify the explicit path of firmware update utility so UEFI environment can easily locate the utility and execute the update procedure. For example, the explicit path can include the HDD/partition/directory/file of the location of the firmware.

The CPU 136, executing the OS 130, can then issue a reset. The CPU 136 can then enter into a pre-boot mode based on the BIOS 112, and can examine the BootNext and Boot#### variable from within the UEFI boot environment. The CPU 136 can then load the Nautilus utility from the location of the memory directly. In an embodiment, the CPU 136 in the UEFI pre-boot environment can directly determine the location of the UEFI utility and the firmware update from the BootNext variable and the Boot#### variable. In an embodiment, the UEFI utility can then output a status of the firmware update in a file if needed. In an embodiment, UEFI utility, such as the Nautilus.efi, does not have any shell dependencies. Thus, the UEFI utility can directly load and execute without first booting to an internal UEFI shell. Alternatively, for any update utility that requires shell, the BIOS 112 can first load the internal shell, then use a startup.nsh script to launch the utility. The input parameters for UEFI utility, such as the Nautilus.efi, can be passed via a variable called "NautilusCommandLine," which can be set either by the CPU 136 executed the OS 130 or BIOS 112.

Figure 2:
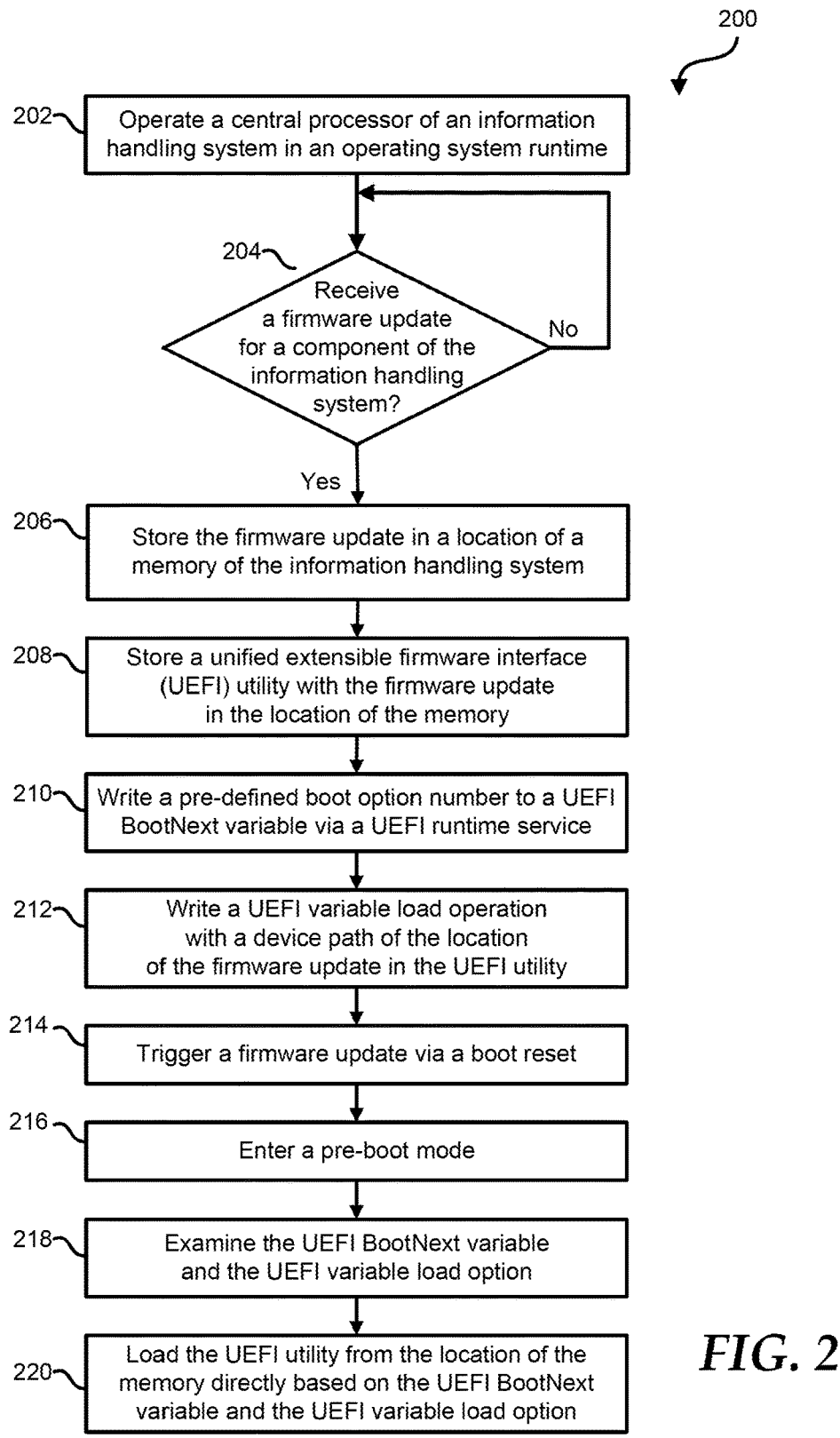
FIG. 2 is a flow diagram of a method for performing operating system initiated firmware updates via UEFI applications according to at least one embodiment of the present disclosure.

FIG. 2 illustrates a method 200 for performing operating system initiated firmware updates via UEFI applications according to at least one embodiment of the present disclosure. At block 202, a central processor of an information handling system is operated in an operating system runtime mode. In an embodiment, the information handling system can include the central processor and a service processor. At block 204, a determination is made whether a firmware update for a component of the information handling system is received. In an embodiment, the firmware update can be received by the service processor. When the firmware update is received, the firmware update is stored in a location of a memory of the information handling system at block 206. In an embodiment, the memory can be a non-volatile storage device.

At block 208, a UEFI utility is stored with the firmware update in the location of the memory. In an embodiment, the UEFI utility can be Nautilus.efi. A pre-defined boot option number is written to a UEFI BootNext variable via a UEFI runtime service at block 210. In an embodiment, the UEFI runtime service can be a SetVariable service associated with the UEFI variable. In an embodiment, the pre-defined boot option number can be sufficiently high to indicate a boot option that is not possible in the information handling system. For example, the boot option number can be 1000, which is not possible in the information handling system because an information handling system would not have 1000 boot devices. In an embodiment, the pre-defined boot option number can be written by the central processor while in the operating system runtime.

At block 212, a UEFI variable load option is written with a device path of the location of the firmware update in the UEFI utility. In an embodiment, the UEFI variable load option is by the central processor while in the operating system runtime. A firmware update via a boot reset is triggered at block 214. At block 216, a pre-boot mode of the central processor is entered. The UEFI BootNext variable and the UEFI variable load option are examined by the central processor while in the pre-boot mode at block 218. In an embodiment, the UEFI variable identifies a device path for the firmware update. At block 220, the UEFI utility is loaded from the location of the memory directly based on the UEFI BootNext variable and the UEFI variable load option.

Figure 3:
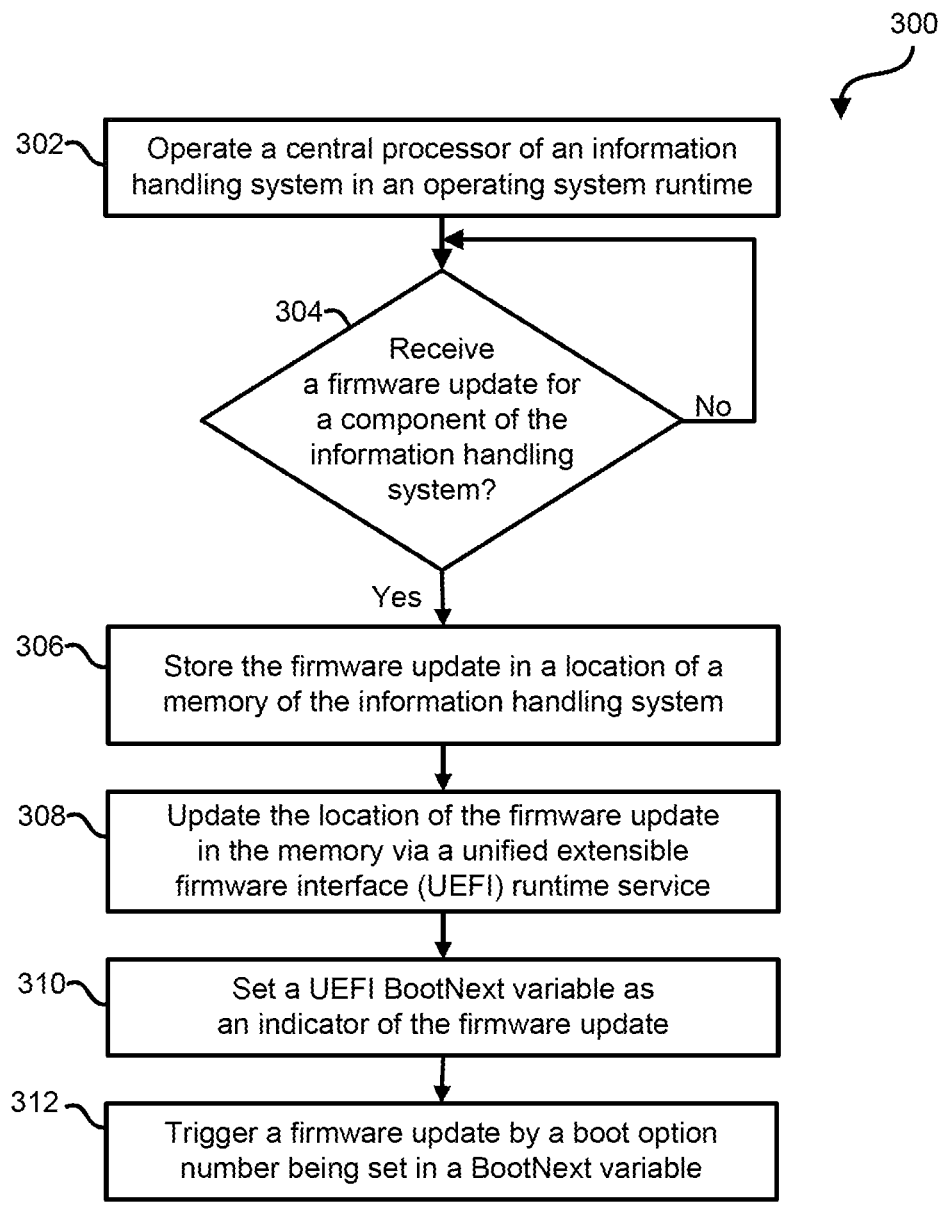
FIG. 3 is a flow diagram of another method for performing operating system initiated firmware updates via UEFI applications according to at least one embodiment of the present disclosure.

FIG. 3 illustrates another method 300 for performing operating system initiated firmware updates via UEFI applications according to at least one embodiment of the present disclosure. At block 302, a central processor of an information handling system is operated in an operating system runtime mode. In an embodiment, the information handling system can include the central processor and a service processor. At block 304, a determination is made whether a firmware update for a component of the information handling system is received. In an embodiment, the firmware update can be received by the service processor.

When the firmware update is received, the firmware update is stored in a location of a memory of the information handling system at block 306. In an embodiment, the memory can be a non-volatile storage device. At block 308, the location of the firmware update in the memory is updated by the central processor while in an operating system runtime via a UEFI runtime service. In an embodiment, the location can be stored as a UEFI variable. In an embodiment, the UEFI variable identifies a device path for the firmware update. In an embodiment, the device path is defined as memory/partition/directory/file. A UEFI BootNext variable is set by the central processor as an indicator of the firmware update at block 310. At block 312, a firmware update for the component is triggered by a boot option number being set in a BootNext variable. In an embodiment, the firmware update is triggered by the central processor via the UEFI runtime service. In an embodiment, the UEFI runtime service can be a SetVariable service associated with the UEFI variable.

Figure 4:
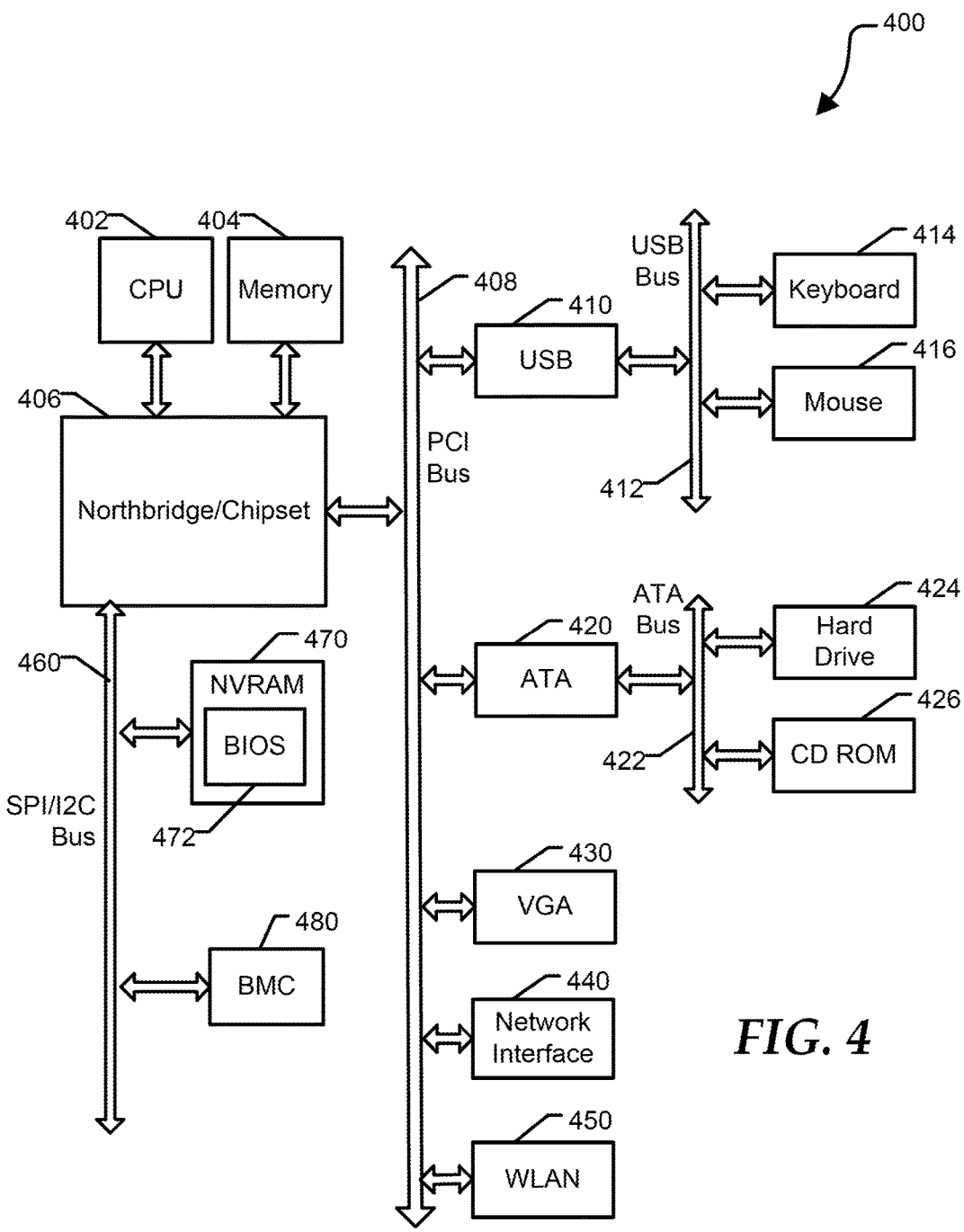
FIG. 4 is a block diagram of a general information handling system according to an embodiment of the present disclosure.

FIG. 4 illustrates a general information handling system 400 including a processor 402, a memory 404, a northbridge/chipset 406, a PCI bus 408, a universal serial bus (USB) controller 410, a USB 412, a keyboard device controller 414, a mouse device controller 416, a configuration an ATA bus controller 420, an ATA bus 422, a hard drive device controller 424, a compact disk read only memory (CD ROM) device controller 426, a video graphics array (VGA) device controller 430, a network interface controller (NIC) 440, a wireless local area network (WLAN) controller 450, a serial peripheral interface (SPI) bus 460, a NVRAM 470 for storing BIOS 472, and a baseboard management controller (BMC) 480. BMC 480 can be referred to as a service processor or embedded controller (EC). Capabilities and functions provided by BMC 480 can vary considerably based on the type of information handling system. For example, the term baseboard management system is often used to describe an embedded processor included at a server, while an embedded controller is more likely to be found in a consumer-level device. As disclosed herein, BMC 480 represents a processing device different from CPU 402, which provides various management functions for information handling system 400. For example, an embedded controller may be responsible for power management, cooling management, and the like. An embedded controller included at a data storage system can be referred to as a storage enclosure processor.

For purpose of this disclosure information handling system 400 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 400 can include processing resources for executing machine-executable code, such as CPU 402, a programmable logic array (PLA), an embedded device such as a System-on-a-Chip (SoC), or other control logic hardware. Information handling system 400 can also include one or more computer-readable medium for storing machine-executable code, such as software or data.

System 400 can include additional processors that are configured to provide localized or specific control functions, such as a battery management controller. Bus 460 can include one or more busses, including a SPI bus, an I2C bus, a system management bus (SMBUS), a power management bus (PMBUS), and the like. BMC 480 can be configured to provide out-of-band access to devices at information handling system 400. As used herein, out-of-band access herein refers to operations performed prior to execution of BIOS 472 by processor 402 to initialize operation of system 400.

BIOS 472 can be referred to as a firmware image, and the term BIOS is herein used interchangeably with the term firmware image, or simply firmware. BIOS 472 includes instructions executable by CPU 402 to initialize and test the hardware components of system 400, and to load a boot loader or an operating system (OS) from a mass storage device. BIOS 472 additionally provides an abstraction layer for the hardware, such as a consistent way for application programs and operating systems to interact with the keyboard, display, and other input/output devices. When power is first applied to information handling system 400, the system begins a sequence of initialization procedures. During the initialization sequence, also referred to as a boot sequence, components of system 400 are configured and enabled for operation, and device drivers can be installed. Device drivers provide an interface through which other components of the system 400 can communicate with a corresponding device.

Information handling system 400 can include additional components and additional busses, not shown for clarity. For example, system 400 can include multiple processor cores, audio devices, and the like. While a particular arrangement of bus technologies and interconnections is illustrated for the purpose of example, one of skill will appreciate that the techniques disclosed herein are applicable to other system architectures. System 400 can include multiple CPUs and redundant bus controllers. One or more components can be integrated together. For example, portions of northbridge/chipset 406 can be integrated within CPU 402. Additional components of information handling system 400 can include one or more storage devices that can store machine-executable code, one or more communications ports for communicating with external devices, and various input and output (I/O) devices, such as a keyboard, a mouse, and a video display. An example of information handling system 400 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 400 can include a set of instructions that can be executed to cause the information handling system to perform any one or more of the methods or computer based functions disclosed herein. The information handling system 400 may operate as a standalone device or may be connected to other computer systems or peripheral devices, such as by a network.

In a networked deployment, the information handling system 400 may operate in the capacity of a server or as a client user computer in a server-client user network environment, or as a peer computer system in a peer-to-peer (or distributed) network environment. The information handling system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single information handling system 400 is illustrated, the term "system" shall also be taken to include any collection of systems or sub-systems that individually or jointly execute a set, or multiple sets, of instructions to perform one or more computer functions.

The information handling system 400 can include a disk drive unit and may include a computer-readable medium, not shown in FIG. 4, in which one or more sets of instructions, such as software, can be embedded. Further, the instructions may embody one or more of the methods or logic as described herein. In a particular embodiment, the instructions may reside completely, or at least partially, within system memory 404 or another memory included at system 400, and/or within the processor 402 during execution by the information handling system 400. The system memory 404 and the processor 402 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a memory to store a firmware update for a component of the information handling system; and
   a central processor to communicate with the memory, the central processor operable in a pre-boot mode and in an operating system runtime mode, the central processor while in the operating system runtime to update a location of the firmware update in the memory via a unified extensible firmware interface (UEFI) runtime service, wherein the location is stored as a UEFI variable, and to trigger a firmware update for the component, via the UEFI runtime service, by a boot option number being set to a UEFI BootNext variable.

2. The information handling system of claim 1, wherein the UEFI runtime service is a SetVariable service associated with the UEFI variable.

3. The information handling system of claim 1, wherein the memory is a non-volatile storage media.

4. The information handling system of claim 1, while in the pre-boot mode, the central processor to examine the UEFI BootNext variable and the UEFI variable, and load the UEFI utility from the location of the memory directly based on the UEFI BootNext variable and the UEFI variable.

5. The information handling system of claim 1, the central processor further to set the UEFI BootNext variable as an indicator of the firmware update.

6. The information handling system of claim 1, wherein the UEFI variable identifies a device path for the firmware update.

7. The information handling system of claim 6, wherein the device path is defined as memory/partition/directory/file.

8. A method comprising:
   receiving a firmware update for a component of the information handling system;
   storing the firmware update in a location of a memory of the information handling system;
   updating, by a central processor of an information handling system while in an operating system runtime, the location of the firmware update in the memory via a unified extensible firmware interface (UEFI) runtime service, the central processor operable in a pre-boot mode and in the operating system runtime mode, wherein the location is stored as a UEFI variable; and
   triggering, by the central processor via the UEFI runtime service, a firmware update for the component by a boot option number being set in UEFI BootNext variable.

9. The method of claim 8, further comprising:
   setting, by the central processor, the UEFI BootNext variable as an indicator of the firmware update.

10. The method of claim 8, further comprising:
    examining, by the central processor while in the pre-boot mode, the UEFI BootNext variable and the UEFI variable; and
    loading, by the central processor while in the pre-boot mode, the UEFI utility from the location of the memory directly based on the UEFI BootNext variable and the UEFI variable.

11. The method of claim 8, wherein the UEFI runtime service is a SetVariable service associated with the UEFI variable.

12. The method of claim 8, wherein the memory is a non-volatile storage media.

13. The method of claim 8, wherein the UEFI variable identifies a device path for the firmware update.

14. The method of claim 13, wherein the device path is defined as memory/partition/directory/file.

15. A method comprising:
receiving a firmware update for a component of the information handling system;
storing the firmware update in a location of a memory of the information handling system;
storing a unified extensible firmware interface (UEFI) utility with the firmware update in the location of the memory;
writing, by a central processor of an information handling system while in an operating system runtime, a predefined boot option number to a UEFI BootNext variable via a UEFI runtime service, the central processor operable in a pre-boot mode and in the operating system runtime mode;
writing, by the central processor while in the operating system runtime, a UEFI variable load option with a device path of the location of the firmware update in the UEFI utility; and
triggering, by the central processor while in the operating system runtime, a firmware update via a boot reset.

16. The method of claim 15, further comprising:
examining, by the central processor while in the pre-boot mode, the UEFI BootNext variable and the UEFI variable load option; and
loading, by the central processor while in the pre-boot mode, the UEFI utility from the location of the memory directly based on the UEFI BootNext variable and the UEFI variable load option.

17. The method of claim 15, wherein the UEFI runtime service is a SetVariable service associated with the UEFI variable.

18. The method of claim 15, wherein the memory is a non-volatile storage media.

19. The method of claim 15, wherein the UEFI variable identifies a device path for the firmware update.

20. The method of claim 15, further comprising:
launching the UEFI utility from the pre-boot mode.

* * * * *